No. 764,064. PATENTED JULY 5, 1904.
A. M. MINTER.
SEAM RIPPER.
APPLICATION FILED MAY 23, 1903.
NO MODEL.
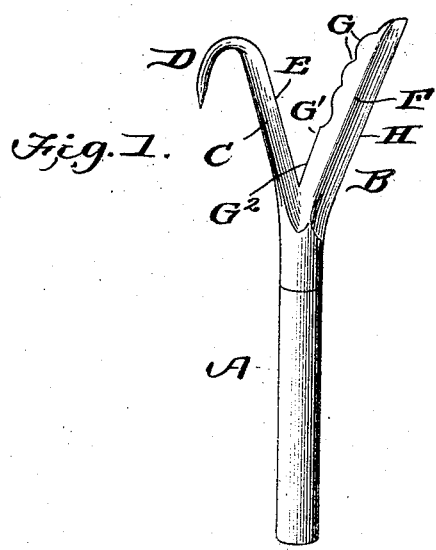
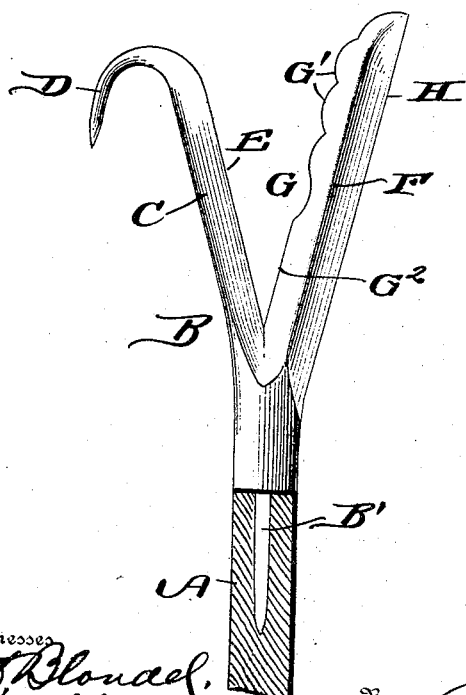
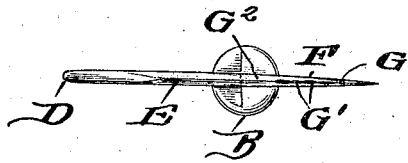
Inventor
A. M. Minter.

No. 764,064. Patented July 5, 1904.

UNITED STATES PATENT OFFICE.

ALLIE M. MINTER, OF PETERSBURG, COLORADO.

SEAM-RIPPER.

SPECIFICATION forming part of Letters Patent No. 764,064, dated July 5, 1904.

Application filed May 23, 1903. Serial No. 158,532. (No model.)

*To all whom it may concern:*

Be it known that I, ALLIE M. MINTER, a citizen of the United States, residing at Petersburg, in the county of Arapahoe and State of Colorado, have invented a new and useful Seam-Ripper, of which the following is a specification.

This invention is a tool which is particularly adapted for ripping seams and picking out the threads, the objects of the invention being to provide a device so shaped that it can be conveniently handled and by means of which a seam can be quickly and easily ripped and also a device which can be used for ripping the stitches of a hem.

With these objects in view the invention consists in the details of construction hereinafter fully described, and pointed out in the claim.

In the drawings forming a part of this specification, Figure 1 is a perspective view of a seam-ripper constructed in accordance with my invention. Fig. 2 is a side elevation of the same, the handle being shown in section. Fig. 3 is a top plan view.

In carrying out my invention I employ a handle A, in the upper end of which is inserted a shank B' of the V-shaped cutting-blade B, one member, C, of said blade being reduced at its outer end and bent outwardly and downwardly, as shown at D. The portion D is cylindrical in cross-section and made very small and pointed, so that it can be used to pick the threads, and thereby open the seam to prevent the sharp edges of the ripper cutting the cloth, as would be the case unless the seam were opened similar to what must be done by an ordinary pin or needle when using the rippers heretofore constructed. The inner edge of the member C is sharpened to provide a cutting edge E. The other member, F, is sharpened upon both the inner and outer edges G and H, the inner edge G being scalloped for the greater portion of its length, as shown at G', the lower part of this edge being straight, as shown at G².

By means of this tool seams can be quickly and easily ripped, and the curved point D can be utilized for picking out the threads. The scalloped cutting edge will be found useful for ripping seams in heavy material, and this scalloped edge is also particularly adapted for ripping the seams of hems. The cutting edge H, which is straight throughout its length, can be used the same as an ordinary penknife.

Having thus fully described my invention, what I claim as new, and desire to secure by Letters Patent, is—

A tool of the kind described comprising a handle and a V-shaped blade connected to said handle, one member of the blade being rounded and bent back upon itself, said rounded and backwardly-bent portion terminating in a sharp point, the inner edge of said member being straight and sharp, the inner edge of the other member being scalloped and sharp, the outer edge of said member being straight and sharp, the end of the scalloped member projecting beyond the end of the other member, substantially as shown.

ALLIE M. MINTER.

Witnesses:
JOSEPH STERLING,
ETTA HALL.